US012190762B2

(12) United States Patent
Osawa et al.

(10) Patent No.: US 12,190,762 B2
(45) Date of Patent: Jan. 7, 2025

(54) CONTROL METHOD FOR DISPLAY DEVICE AND DISPLAY DEVICE

(71) Applicant: SEIKO EPSON CORPORATION, Tokyo (JP)

(72) Inventors: Seiji Osawa, Okaya (JP); Kazuhisa Mizusako, Shiojiri (JP); Daigo Hokazono, Suwa (JP); Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/395,935

(22) Filed: Dec. 26, 2023

(65) Prior Publication Data

US 2024/0212541 A1 Jun. 27, 2024

(30) Foreign Application Priority Data

Dec. 27, 2022 (JP) ................................ 2022-209459

(51) Int. Cl.
*G09G 3/00* (2006.01)
*G09G 3/36* (2006.01)

(52) U.S. Cl.
CPC ........... *G09G 3/007* (2013.01); *G09G 3/3607* (2013.01); *G09G 2320/0285* (2013.01)

(58) Field of Classification Search
None
See application file for complete search history.

(56) References Cited

U.S. PATENT DOCUMENTS

2022/0293060 A1* 9/2022 Miyata .............. G02F 1/133606

FOREIGN PATENT DOCUMENTS

JP 2014-219686 A 11/2014
JP 2021-004919 A 1/2021

* cited by examiner

*Primary Examiner* — Stephen T. Reed
(74) *Attorney, Agent, or Firm* — Oliff PLC

(57) ABSTRACT

A display device includes liquid crystal panels, and displays an image, based on emission light from each of the liquid crystal panels. A display control circuit of the display device supplies image data of respective colors R, G, and B to the corresponding liquid crystal panels. A panel pixel having the lowest transmittance of three panel pixels corresponding to white-side pixels at domain boundaries is regarded as a reference panel pixel. The display control circuit reduces a gray scale level of pixel data supplied to two panel pixels other than the reference panel pixel of the three panel pixels. With this, coloring of the white-side pixels can be suppressed.

8 Claims, 18 Drawing Sheets

| DOMAIN BOUNDARY | | CORRECTION DATA FOR R | CORRECTION DATA FOR G | CORRECTION DATA FOR B |
|---|---|---|---|---|
| GRAY SCALE LEVEL ON BLACK SIDE | GRAY SCALE LEVEL ON WHITE SIDE | CORRECTION GRAY SCALE LEVEL ON BLACK SIDE | CORRECTION GRAY SCALE LEVEL ON WHITE SIDE | CORRECTION GRAY SCALE LEVEL ON WHITE SIDE |

FIG. 10

CONTROL METHOD FOR DISPLAY DEVICE AND DISPLAY DEVICE

The present application is based on, and claims priority from JP Application Serial Number 2022-209459, filed Dec. 27, 2022, the disclosure of which is hereby incorporated by reference herein in its entirety.

BACKGROUND

1. Technical Field

The present disclosure relates to a control method for a display device and a display device.

2. Related Art

In a three-panel liquid crystal projector, a liquid crystal panel is provided for each of colors R, G, and B, for example, and images generated on the liquid crystal panels are synthesized to generate a color image. The liquid crystal panel used in the liquid crystal projector has such a configuration that pixel electrodes are arrayed in the matrix at one base plate, common electrodes are provided at the other base plate, and liquid crystal is sandwiched between the pixel electrodes and the common electrodes. When a voltage corresponding to a gray scale level is maintained between the pixel electrodes and the common electrodes, an alignment state of liquid crystal molecules is defined. With this, a transmittance or a reflectance corresponding to the voltage is obtained. Therefore, in the above-mentioned configuration, among the electric fields that act on the liquid crystal molecules, an electric field in a direction from the pixel electrodes to the common electrodes or a direction opposite thereto, in other words, an electric field vertical to a base plate surface contributes to control of a transmittance or the like. In the following description, the electric field vertical to the base plate surface is referred to as a vertical electric field in some cases.

In recent years, an interval between the pixel electrodes has been reduced for size reduction and high definition enhancement. With this, an influence of an electric field generated between the pixel electrodes adjacent to each other, in other words, an electric field in a direction parallel to the base plate surface is not negligible. In the following description, the electric field parallel to the base plate surface is referred to as a horizontal electric field in some cases. When the horizontal electric field is added to the vertical electric field, an alignment failure of the liquid crystal, in other words, a domain is generated, which is visually recognized as a display defect. In order to suppress a display defect due to a domain, the following technique is proposed, for example. Specifically, when it is assumed that an electric field in a horizontal direction is increased, more specifically, a difference between voltages to be applied to pixel electrodes adjacent to each other is equal to or greater than a threshold value, correction is performed for each of the colors R, G, and B so that the difference between the voltages is reduced. Such a technique is proposed (for example, see JP-A-2021-004919). Note that such correction is referred to as domain correction in some cases.

JP-A-2021-004919 discloses that V-T characteristics of the respective colors R, G, and B are changed to be similar to one another based on a correction value with respect to a pixel of a liquid crystal panel on which a domain is generated. In the technique disclosed in JP-A-2021-004919, for example, when a first difference between a first gray scale level specified for a first sub pixel corresponding to a first color of the respective colors R, G, and B in a first pixel and a second gray scale level specified for a second sub pixel corresponding to the first color in a second pixel adjacent to the first pixel is equal to or greater than a threshold value, the first gray scale level is corrected to a first correction gray scale level by adjusting the first gray scale level to be close to the second gray scale level by a first correction amount. Further, in the technique disclosed in JP-A-2021-004919, a third gray scale level specified for a third sub pixel corresponding to a second color of the respective colors R, G, and B in the first pixel is corrected to a second correction gray scale level by adjusting the third gray scale level to be close in a direction from the second gray scale level to the first gray scale level by a second correction amount based on a second difference between the first correction gray scale level and the second gray scale level.

However, in a case in which a voltage range that is used for the liquid crystal panel of each of the colors R, G, and B differs for each color, when correction is performed by the technique disclosed in JP-A-2021-004919, a relationship of the voltages for each of the liquid crystal panels is disrupted, and there may be a risk that correction cannot be performed suitably. An example of a case in which a voltage range that is used for the liquid crystal panel of each of the colors R, G, and B differs for each color may be a case in which a color mode differs for each of the colors R, G, and B.

SUMMARY

According one aspect of the present disclosure, a control method for a display device is a control method for a display device including a first liquid crystal panel, a second liquid crystal panel, and a third liquid crystal panel and being configured to display an image, based on emission light from the first liquid crystal panel, emission light from the second liquid crystal panel, and emission light from the third liquid crystal panel, the control method including supplying first color pixel data to the first liquid crystal panel, supplying second color pixel data being different from the first color pixel data to the second liquid crystal panel, and supplying third color pixel data being different from the first color pixel data and the second color pixel data to the third liquid crystal panel, and reducing a gray scale level of pixel data supplied to panel pixels other than a reference panel pixel among a first panel pixel, a second panel pixel and a third panel pixel, the reference panel pixel being a panel pixel having the lowest transmittance among the first panel pixel of the first liquid crystal panel that corresponds to a first display pixel, the second panel pixel of the second liquid crystal panel that corresponds to the first display pixel, and the third panel pixel of the third liquid crystal panel that corresponds to the first display pixel, in the image.

Further, according to another aspect of the present disclosure, a control method for a display device is a control method for a display device including a first liquid crystal panel, a second liquid crystal panel, and a third liquid crystal panel, being configured to display an image, based on emission light from the first liquid crystal panel, emission light from the second liquid crystal panel, and emission light from the third liquid crystal panel, and being provided with a correction look-up table that stores correction data corresponding to a difference between gray scale levels of two display pixels adjacent to each other in the image, the control method including acquiring correction data from the correction look-up table, based on pixel data indicating a gray scale level of each color of a first display pixel in the image and pixel data indicating a gray scale level of a second display pixel adjacent to the first display pixel, reducing a gray scale level of pixel data, based on the correction data, the pixel data being supplied to panel pixels other than a reference panel pixel among a first panel pixel, a second panel pixel, and a third panel pixel, the reference panel pixel being a panel pixel having the lowest transmittance among the first panel pixel of the first liquid crystal panel that corresponds to the first display pixel, the second panel pixel of the second liquid crystal panel that corresponds to the first display pixel, and the third panel pixel of the third liquid crystal panel that corresponds to the first display pixel, and supplying pixel data in which gray scale levels of two colors are corrected based on the correction data, for each color to the first liquid crystal panel, the second liquid crystal panel, and the third liquid crystal panel.

Further, according to another aspect of the present disclosure, a display device includes a first liquid crystal panel, a second liquid crystal panel, a third liquid crystal panel, a storage device configured to store a correction look-up table that stores correction data corresponding to a difference between gray scale levels of two display pixels adjacent to each other in an image displayed based on emission light from the first liquid crystal panel, emission light from the second liquid crystal panel, and emission light from the third liquid crystal panel, and a control device, wherein the control device executes processing of acquiring correction data from the correction look-up table, based on pixel data indicating a gray scale level of each color of a first display pixel in the image and pixel data indicating a gray scale level of a second display pixel adjacent to the first display pixel, reducing a gray scale level of pixel data, based on the correction data, the pixel data being supplied to panel pixels other than a reference panel pixel among a first panel pixel, a second panel pixel, and a third panel pixel, the reference panel pixel being a panel pixel having the lowest transmittance among the first panel pixel of the first liquid crystal panel that corresponds to the first display pixel, the second panel pixel of the second liquid crystal panel that corresponds to the first display pixel, and the third panel pixel of the third liquid crystal panel that corresponds to the first display pixel, and supplying pixel data in which gray scale levels of two colors are corrected based on the correction data, for each color to the first liquid crystal panel, the second liquid crystal panel, and the third liquid crystal panel.

BRIEF DESCRIPTION OF THE DRAWINGS

FIG. 10 is a diagram illustrating an example of stored contents in a correction LUT.

DESCRIPTION OF EMBODIMENTS

With reference to the drawings, a display device according to an exemplary embodiment of the present disclosure is described below. Note that, in each of the drawings, dimensions and scale of each part are made different from actual ones as appropriate. Further, exemplary embodiments described below are suitable specific examples, and various technically preferable limitations are applied. However, the scope of the disclosure is not limited to these exemplary embodiments unless they are specifically described in the following description as limiting the disclosure.

A: First Exemplary Embodiment

Figure 1:
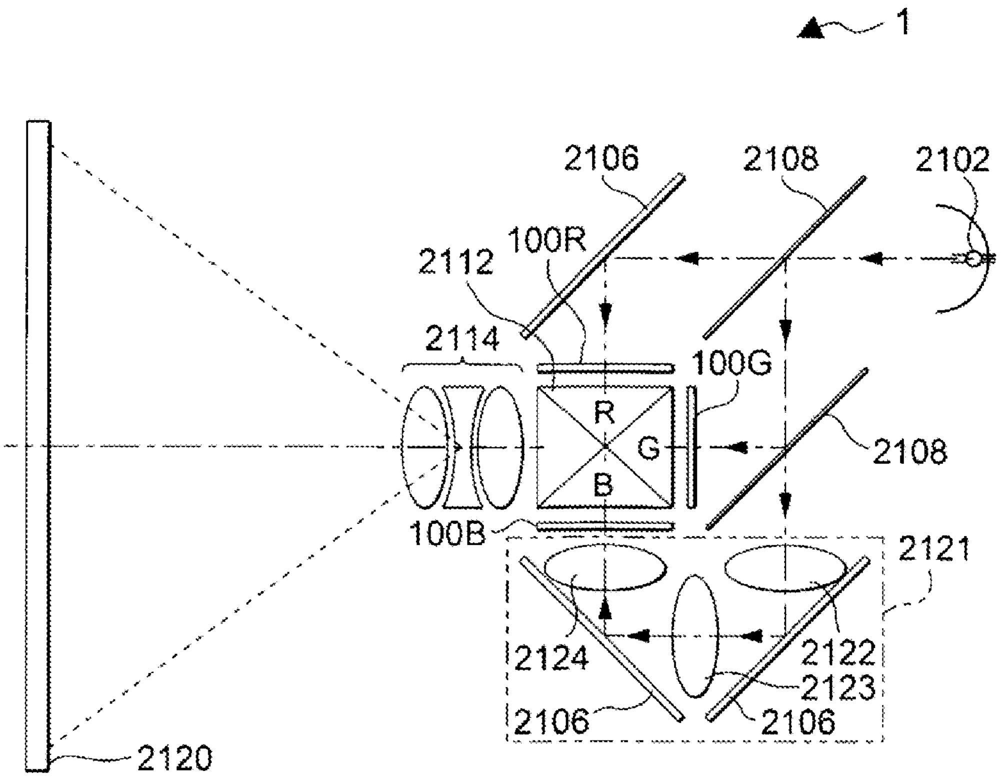
FIG. 1 is a diagram illustrating an optical configuration example of a display device according to a first exemplary embodiment of the present disclosure.

FIG. 1 is a diagram illustrating an optical configuration of a display device 1 according to an embodiment exemplary embodiment of the present disclosure. The display device 1 is a three-panel liquid crystal projector including a liquid crystal panel 100R, a liquid crystal panel 100G, and a liquid crystal panel 100B. Note that the liquid crystal panel 100R is an example of a first liquid crystal panel in the present disclosure. Note that the liquid crystal panel 100G is an example of a second liquid crystal panel in the present disclosure. Note that the liquid crystal panel 100B is an example of a third liquid crystal panel in the present disclosure.

A lamp unit 2102 including a white light source such as a halogen lamp is provided inside the display device 1. Projection light emitted from the lamp unit 2102 is split into three primary colors of red (R), green (G), and blue (B) by three mirrors 2106 and two dichroic mirrors 2108 arranged inside the display device 1. Of the light of the primary colors, light of R, light of G, and light of B are incident on the liquid crystal panel 100R, the liquid crystal panel 100G, and the liquid crystal panel 100B, respectively. Note that an optical path of the light of B is longer than those of the light red and green. Therefore, the light of B is guided to the liquid crystal panel 100B via a relay lens system 2121 formed of an incidence lens 2122, a relay lens 2123, and an emission lens 2124 to prevent a loss in the optical path.

The liquid crystal panel 100R includes sub pixel circuits arrayed in the matrix, and generates a transmitted image of R by the light transmitted through a liquid crystal element of the sub pixel circuit, based on a data signal corresponding to R. Similarly, in the liquid crystal panel 100G, a transmitted image of G is generated based on a data signal corresponding to G. In the liquid crystal panel 100B, a transmitted image of B is generated based on a data-signal corresponding to B.

The transmitted image of each of the colors generated by the liquid crystal panels 100R, 100G, and 100B, respectively, is incident on a dichroic prism 2112 from three directions. Then, at this dichroic prism 2112, the light of R and the light of B are refracted at 90 degrees, whereas the light of G travels in a straight line. Accordingly, the images of the respective colors are synthesized, and subsequently a color image is projected on a screen 2120 by a projection lens 2114. Note that, while the transmitted images by the liquid crystal panels 100R and 100B are projected after being reflected by the dichroic prism 2112, the transmitted image by the liquid crystal panel 100G travels in a straight line and is projected. Thus, the respective transmitted images of the liquid crystal panels 100R and 100B are laterally inverted with respect to the transmitted image of the liquid crystal panel 100G.

Figure 2:
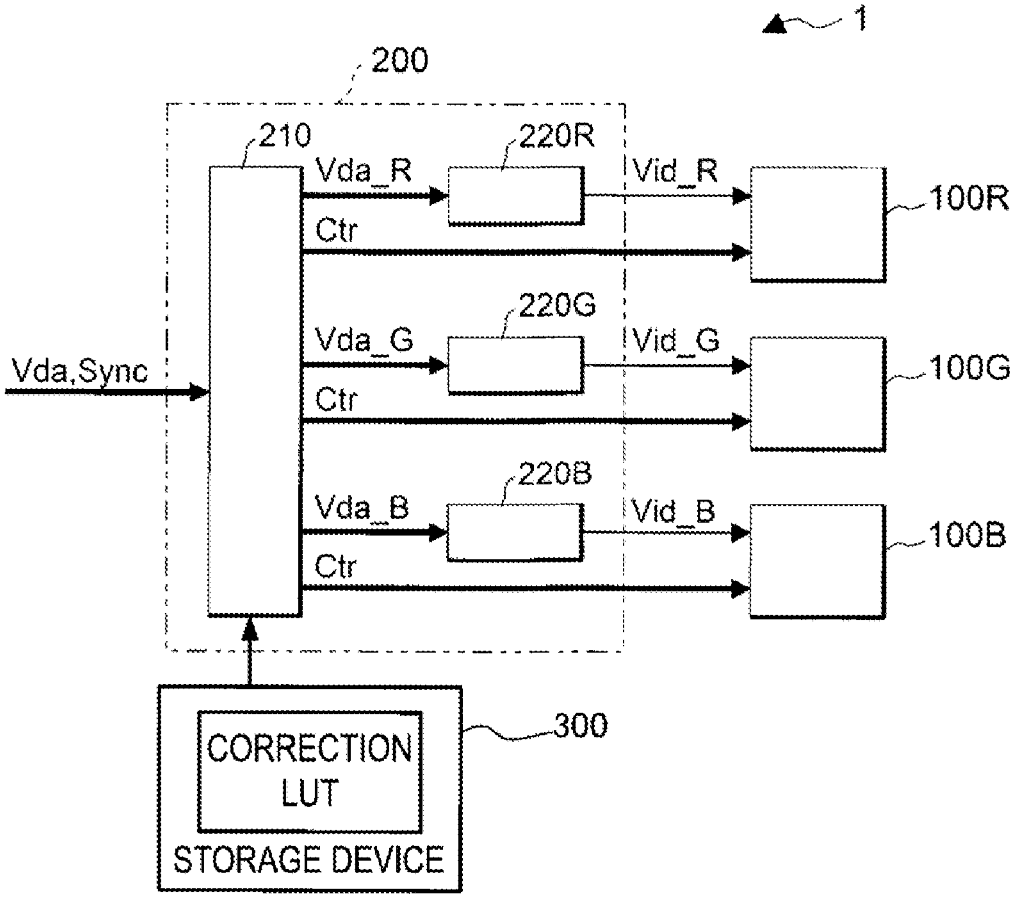
FIG. 2 is a block diagram illustrating an electrical configuration example of the display device.

FIG. 2 is a block diagram illustrating an electrical configuration of the display device 1. As illustrated in FIG. 2, the display device 1 includes a video processing device 200, a storage device 300, and the liquid crystal panels 100R, 100G, and 100B that are described above.

Video data Vida is supplied from a host device, which is omitted in illustration, in synchronization with a synchronization signal Sync. The video data Vda designates a gray scale level of a pixel in an image to be displayed for each of R, G, and B, for example, by 8 bits. One pixel indicates a minimum unit for configuring a color image that is synthesized by the liquid crystal panel 100R, the liquid crystal panel 100G, and the liquid crystal panel 100B. One pixel is further divided into three sub pixels including a red sub pixel of the liquid crystal panel 100R, a green sub pixel of the liquid crystal panel 100G, and a blue sub pixel of the liquid crystal panel 100B. Each of the red, green, and blue sub pixels is an example of a panel pixel. The synchronization signal Sync includes a vertical synchronization signal that instructs a start of vertical scanning of the pixels arrayed in the matrix, a horizontal synchronization signal that instructs a start of horizontal scanning for one row in the above-mentioned array, and a clock signal that indicates a timing of one pixel of the video data.

The video processing device 200 includes a display control circuit 210, a processing circuit 220R, a processing circuit 220G, and a processing circuit 220B. The display control circuit 210 processes the video data Vda and the synchronization signal Sync, and outputs a control signal Ctr for driving the liquid crystal panel 100R, the liquid crystal panel 100G, and the liquid crystal panel 100B. Note that the control signal Ctr includes a signal required for scanning the sub pixel circuits that are arrayed in the matrix on the liquid crystal panel 100R, the liquid crystal panel 100G, and the liquid crystal panel 100B. Further, at timing when the control signal Ctr is output, the display control circuit 210 supplies video data Vda_R corresponding to R, video data Vda_G corresponding to G, and video data Vda_B corresponding to B to the liquid crystal panel 100R, the liquid crystal panel 100G, and the liquid crystal panel 100B, respectively. The video data Vda_R is an example of first color pixel data. The video data Vda_G is an example of second color pixel data. The video data Vda_B is an example of third color pixel data.

Further, as required, the display control circuit 210 performs correction for each of the video data Vda_R, the video data Vda_G, and the video data Vda_B so as to suppress coloring caused by a domain. Details of the correction are described later. The display control circuit 210 is an example of a control device according to the present disclosure.

The processing circuit 220R converts the video data Vda_R that is supplied from the display control circuit 210, into a data signal Vid_R of an analog voltage, and supplies the data signal Vid_R to the liquid crystal panel 100R. The processing circuit 220G converts the video data Vda_G that is supplied from the display control circuit 210, into a data signal Vid_G of an analog voltage, and supplies the data signal Vid_G to the liquid crystal panel 100G. The processing circuit 220B converts the video data Vda_B that is supplied from the display control circuit 210, into a data signal Vid_B of an analog voltage, and supplies the data signal Vid_B to the liquid crystal panel 100B.

The storage device 300 is configured by a non-volatile memory such as a flash Read Only Memory (ROM). The storage device 300 stores a correction look-up table for each of the colors R, G, and B. Note that, in FIG. 2, the look-up table is denoted with "LUT", and the same notation is used throughout the present specification. Although details are described later, the correction LUT stores correction data indicating a correction value of a gray scale level of each of the colors at the time of correcting each of the video data Vda_R, the video data Vda_G, and the video data Vda_B so as to suppress coloring caused by a domain.

Next, description is made on the liquid crystal panel 100R, the liquid crystal panel 100G, and the liquid crystal panel 100B. The liquid crystal panels 100R, 100G, and 100B only differ in the color of incident light, that is, the wavelength, and otherwise have the same structure. Thus, the liquid crystal panel 100R, the liquid crystal panel 100G, and the liquid crystal panel 100B is denoted with the reference symbol 100, and is generally described without specifying a color.

Figure 3:
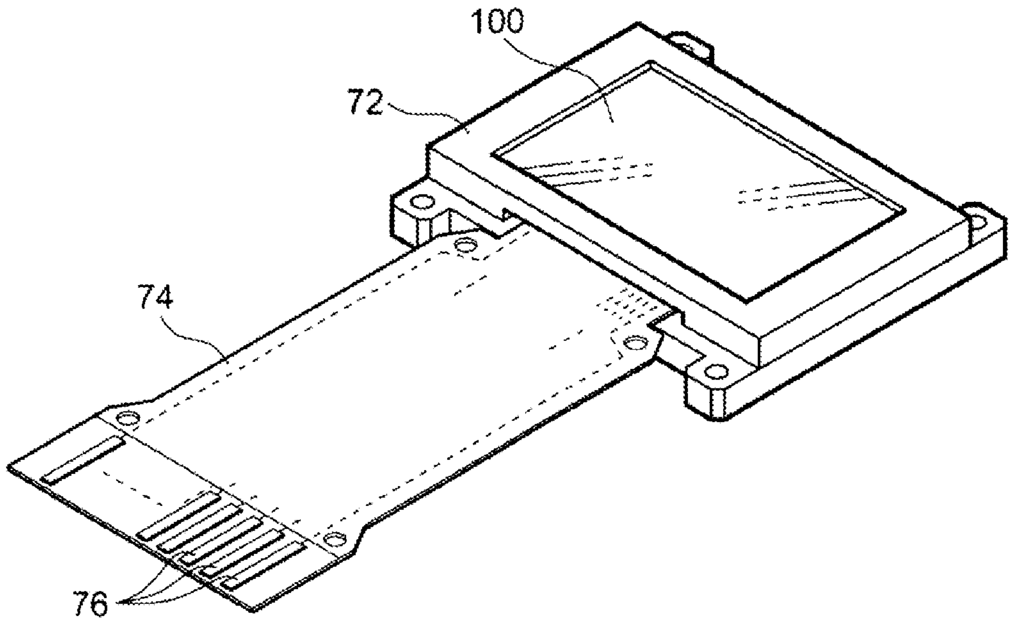
FIG. 3 is a diagram illustrating a configuration of a liquid crystal panel in the display device.
Figure 4:
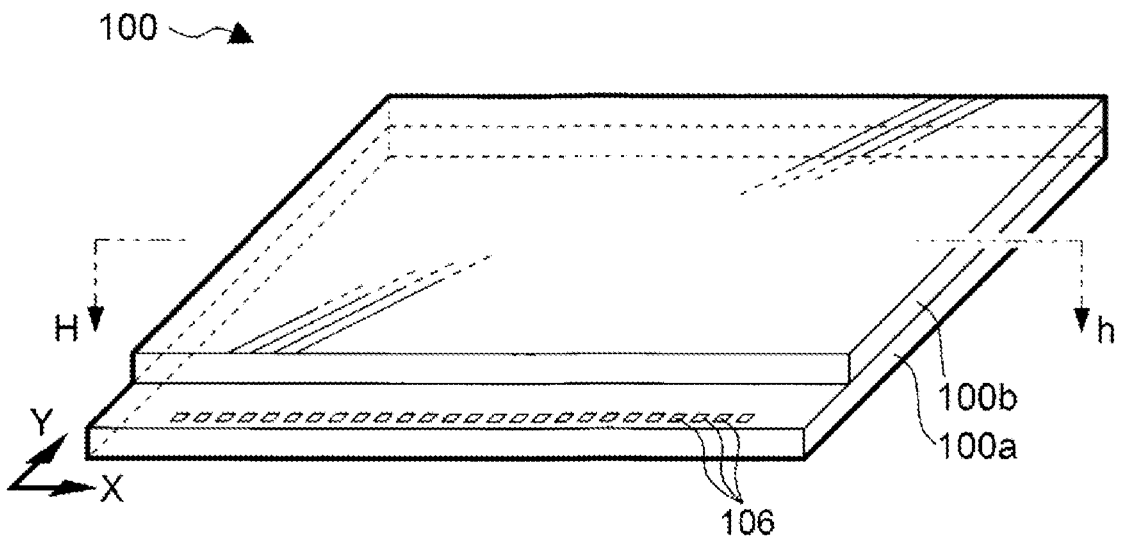
FIG. 4 is a perspective view illustrating a main structure of the liquid crystal panel.
Figure 5:
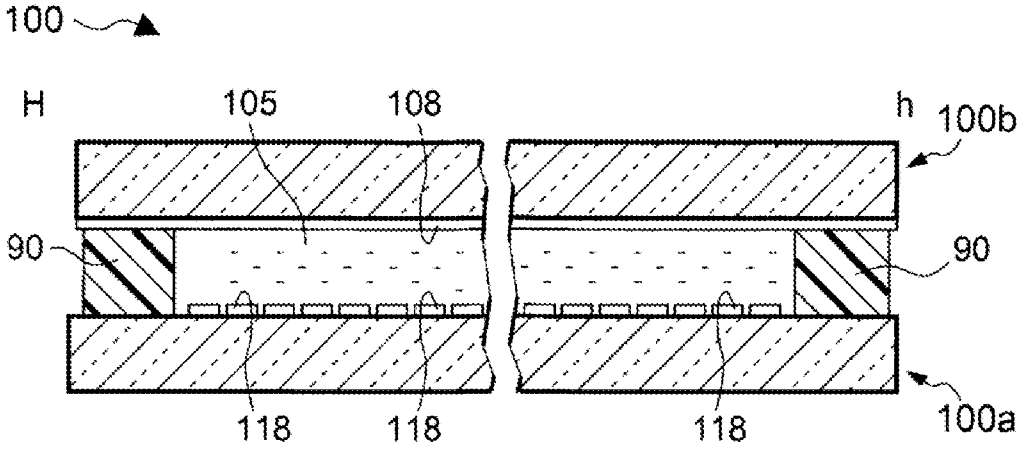
FIG. 5 is a cross-sectional view illustrating a structure of the liquid crystal panel.

FIG. 3 is a diagram illustrating a configuration of the liquid crystal panel 100, FIG. 4 is a diagram illustrating a main structure of the liquid crystal panel 100, and FIG. 5 is a cross-sectional view taken along with the line H-h in FIG. 4. As illustrated in FIG. 3, the liquid crystal panel 100 is accommodated in a frame-like case 72 including an opening in a display region. One end of an FPC substrate 74 is to the liquid crystal panel 100. Note that FPC is an abbreviation for Flexible Printed Circuits. The other end of the FPC substrate 74 is provided with a plurality of terminals 76, and the video processing device 200 is coupled thereto.

As illustrated in FIG. 4 and FIG. 5, the liquid crystal panel 100 has a structure in which an element substrate 100*a* on which pixel electrodes 118 are provided and a counter substrate 100*b* on which a common electrode 108 is provided are bonded to each other by a seal material 90 including a spacer, which is omitted in illustration, with a constant gap therebetween so that electrode-formed surfaces thereof face each other and liquid crystal 105 is sealed in the gap.

As the element substrate 100*a* and the counter substrate 100*b*, transmissive substrates such as glass or quartz substrates are used. As illustrated in FIG. 4, one side of the element substrate 100*a* protrudes from the counter substrate 100*b*. In this protruding region, a plurality of terminals 106 are provided along the X direction. The one end of the FPC substrate 74 illustrated in FIG. 3 is coupled to the plurality of terminals 106, and the various signals described above are supplied thereto.

On the surface of the element substrate 100*a* facing the counter substrate 100*b*, the pixel electrodes 118 are formed by patterning a transparent conductive layer such as ITO, for example. Note that ITO is an abbreviation for Indium Tin Oxide. Further, various elements other than the electrodes are provided on the facing surface of the element substrate 100*a* and the facing surface of the counter substrate 100*b*, but are omitted in FIG. 3.

Figure 6:
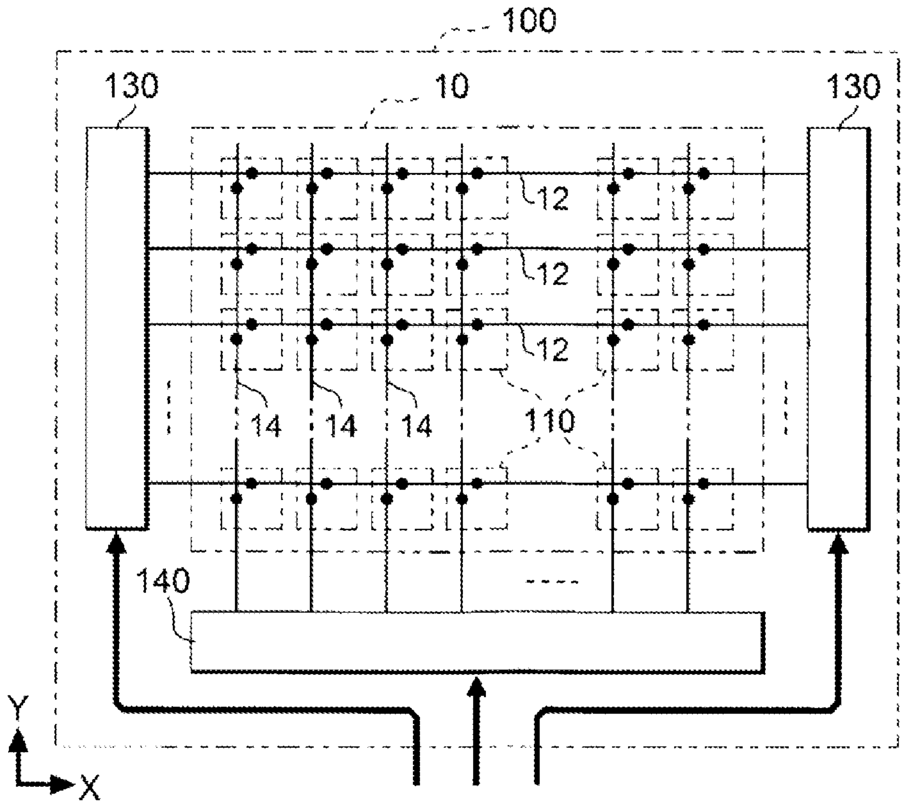
FIG. 6 is a block diagram illustrating an electrical configuration of the liquid crystal panel.

FIG. 6 is a block diagram illustrating an electrical configuration of the liquid crystal panel 100. In the liquid crystal panel 100, scanning line drive circuits 130 and a data line drive circuit 140 are provided at the periphery of a display region 10.

In the display region 10 of the liquid crystal panel 100, sub pixel circuits 110 corresponding to sub pixels of an image to be displayed are arrayed in the matrix. More specifically, in the display region 10, a plurality of scanning lines 12 are provided extending in the X direction in the drawing, and a plurality of data lines 14 are provided extending in the Y direction, while the data lines 14 are electrically insulated from the scanning lines 12. The sub pixel circuits 110 are provided in the matrix so as to correspond to the intersections between the plurality of scanning lines 12 and the plurality of data lines 14.

When the number of the scanning lines 12 is m and the number of the data lines 14 is n, the sub pixel circuits 110 are arrayed in the matrix of m rows and n columns. m and n are each an integer of 2 or greater. With respect to the scanning lines 12 and the sub pixel circuits 110, in order to distinguish the rows of the matrix from each other, the rows may be referred as a 1st, 2nd, 3rd . . . (m−1)-th, and m-th row in ascending order from the top in the drawing. Similarly, with respect to the data lines 14 and the sub pixel circuits 110, in order to distinguish the columns of the matrix from each other, the columns may be referred as a 1st, 2nd, 3rd . . . (n−1)-th, and n-th column in ascending order from the left in the drawing.

The scanning line drive circuit 130 selects the scanning lines 12 one by one, for example, in order of the 1st, 2nd, 3rd . . . and m-th rows under the control of the display control circuit 210, and sets a scanning signal to the selected scanning line 12 to the H level. Note that the scanning line drive circuit 130 sets the scanning signals to the scanning lines 12 other than the selected scanning line 12, to the L level.

The data line drive circuit 140 latches one row of the data signals supplied from the circuit of the corresponding color, that is, from one of the processing circuit 220R, the processing circuit 220G, and the processing circuit 220B, and in a period in which the scanning signal to the scanning line 12 is set to the H level, outputs the data signal to the sub pixel circuit 110 located at that scanning line 12 via the data line 14.

Figure 7:
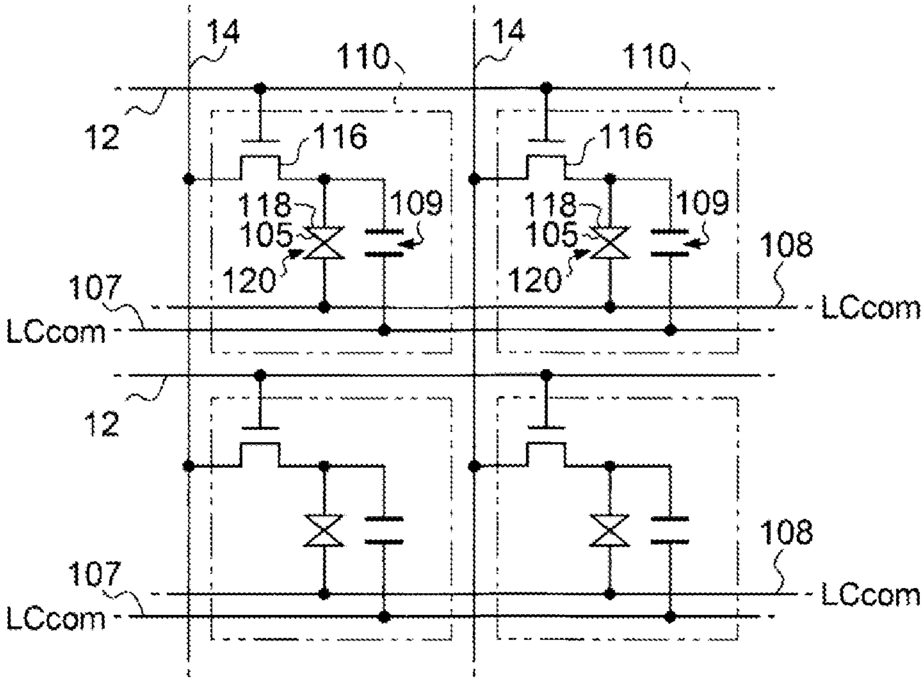
FIG. 7 is a diagram illustrating a configuration of a pixel circuit in the liquid crystal panel.

FIG. 7 is a diagram illustrating an equivalent circuit of a total of four of the sub pixel circuits 110, in two rows and two columns, corresponding to the intersections between two of the adjacent scanning lines 12 and two of the adjacent data lines 14. As illustrated in FIG. 7, the sub pixel circuit 110 includes a transistor 116 and a liquid crystal element 120. The transistor 116 is, for example, an n-channel thin film transistor. In the sub pixel circuit 110, a gate node of the transistor 116 is coupled to the scanning line 12, a source node thereof is coupled to the data line 14, and a drain node thereof is coupled to the pixel electrode 118 having a substantially square shape in plan view.

The common electrode 108 is provided commonly for all of the pixels, so as to face the pixel electrodes 118. A voltage LCcom is applied to the common electrode 108. The liquid crystal 105 is interposed between the pixel electrodes 118 and the common electrode 108, as described above. Thus, the liquid crystal element 120, in which the liquid crystal 105 is interposed between the pixel electrodes 118 and the common electrode 108, is formed for each of the sub pixel circuits 110. Further, a storage capacitor 109 is provided in parallel with the liquid crystal element 120. One end of the storage capacitor 109 is coupled to the pixel electrode 118, while the other end thereof is coupled to a capacitor line 107. A temporally constant voltage, for example, the same voltage LCcom as the voltage applied to the common electrode 108, is applied to the capacitor line 107. Since the sub pixel circuits 110 are arrayed in the matrix in the X direction, which is the extending direction of the scanning lines 12, and in the Y direction, which is the extending direction of the data lines 14, the pixel electrodes 118 included in the sub pixel circuits 110 are also arrayed in the Y direction and the X direction.

In the scanning line 12 in which the scanning signal is set to the H level, the transistor 116 of the sub pixel circuit 110 provided corresponding to that scanning line 12 is turned on. Since the data line 14 and the pixel electrode 118 are electrically coupled to each other as a result of the transistor 116 being turned on, the data signal supplied to the data line 14 reaches the pixel electrode 118 through the transistor 116 that has been turned on. When the scanning line 12 is set to the L level, the transistor 116 is turned off, but the voltage of the data signal, which has reached the pixel electrode 118, is retained by capacitive properties of the liquid crystal element 120 and the storage capacitor 109.

As is well known, in the liquid crystal element 120, the liquid crystal molecular alignment changes in accordance with the electric field generated by the pixel electrode 118 and the common electrode 108. Thus, the liquid crystal element 120 has a transmittance corresponding to the effective value of the applied voltage. In the present exemplary embodiment, it is assumed that a transmittance is increased as the voltage applied to the liquid crystal element 120 is increased.

An operation of supplying the data signal to the pixel electrode 118 of the liquid crystal element 120 is performed in order of the 1st, 2nd, 3rd . . . and m-th rows. With this, the voltage corresponding to the data signal is maintained in each of the liquid crystal elements 120 of the sub pixel circuits 110 that are arrayed in m rows and n columns. Each of the liquid crystal elements 120 has a target transmittance by maintaining the voltage as described above, and an image is generated with the pixels that are arrayed in m rows and n columns.

Note that the pixel electrode 118 is provided to the sub pixel circuit 110, and is provided so as to express a sub pixel of any one of the colors. Thus, in a strict sense, the pixel electrode 118 is referred to as a sub pixel electrode. However, in the present exemplary embodiment, the sub pixels of the three colors are synthesized to express one pixel, and the shape of one pixel is substantially equivalent to the shape of the pixel electrode 118 in plan view. Thus, the pixel electrode 118 is referred to as a pixel electrode.

Note that, in FIG. 6, there is adopted a configuration in which the two scanning line drive circuits 130 are provided and the scanning signal is supplied from both the ends of the scanning line 12. The reason for this configuration is to suppress an influence of a delay of the scanning signal on display as compared to a case in which the scanning signal is supplied from only one end. Further, when the liquid crystal element 120 is driven, it is required to perform AC driving so as to prevent degradation of the liquid crystal 105. Thus, a high-level positive voltage and a low-level negative voltage with respect to the voltage at the center of the amplitude is applied to the pixel electrode 118 in an alternating switching manner. In the present exemplary embodiment, in such AC driving, there is adopted an in-plane switching method in which the writing polarity of each of the liquid crystal elements 120 is always the same during the vertical scanning of the sub pixel circuit 110. Note that the voltage at the center of the amplitude that is referred herein may be regarded as substantially the same voltage as the voltage LCcom to be applied to the common electrode 108.

Incidentally, a pitch between the pixels is reduced for size reduction and high definition enhancement, an electric filed in the horizontal direction that is generated between the pixel electrodes adjacent to each other generates a domain, which is visually recognized as a display defect.

Figure 8:
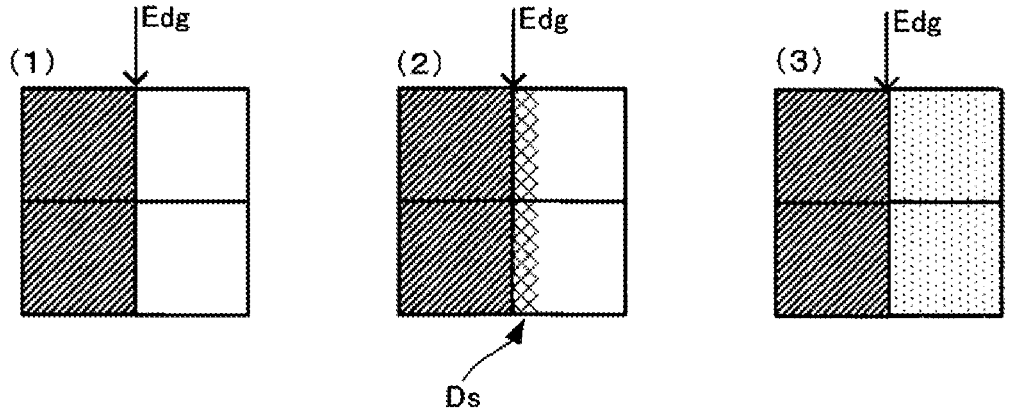
FIG. 8 is a diagram illustrating an example of degradation of display quality due to a domain.

FIG. 8 is a diagram for describing degradation of display quality due to a domain while enlarging a pixel of a displayed image in plan view. In FIG. 8, one square frame represents one pixel. For example, in a case in which a white character is displayed on a black background, when a pixel forming the background and a pixel forming the white character are enlarged, it is assumed that display illustrated in (1) of FIG. 8 is obtained. Note that the white color referred herein refers to a state in which the three sub pixels of R, G, and B are synthesized at the highest gray scale level, in other words, at the maximum transmittance, for example. A white-outlined square frame in FIG. 8 represents a white pixel. The black color refers to a state in which the three sub pixels of R, G, and B are synthesized at the lowest gray scale level, in other words, at the minimum transmittance. A square frame with diagonal hatching in FIG. 8 represents a black pixel. In the following description, of two pixels adjacent to each other in a displayed image, a pixel obtained by synthesizing the three sub pixels of R, G, and B at the highest transmittance is referred to as a white-side pixel, and a pixel obtained by synthesizing the three sub pixels of R, G, and B at the minimum transmittance is referred to as a black-side pixel. Note that the white-side pixel is not limited to a pixel obtained by synthesizing the three sub pixels of R, G, and B at the maximum transmittance and the black-side pixel is not limited to a pixel obtained by synthesizing the three sub pixels of R, G, and B at the minimum transmittance. The white-side pixel is only required to be a pixel having a gray scale level higher than that of the black-side pixel. In the following description, in some cases, a sub pixel corresponding to the white-side pixel is referred to as a white-side sub pixel, and a sub pixel corresponding to the black-side pixel is referred to as a black-side sub pixel.

In this state, in a case of one color, for example, the color of G, a difference between a voltage of the pixel electrodes 118 corresponding to sub pixels corresponding to the white-side pixels, specifically, sub pixels on the right side in (1) of FIG. 8 and a voltage of the pixel electrodes 118 corresponding to sub pixels corresponding to the black-side pixels, specifically, sub pixels on the left side in (1) of FIG. 8 is increased. As a result, a horizontal electric field is generated. As illustrated in (2) of FIG. 8, due to the horizontal electric field, a domain Ds is generated near a boundary Edg between the white-side sub pixels and the black-side sub pixels. Then, display quality is degraded. As illustrated in (2) of FIG. 8, when the domain Ds is generated, the transmittance in the white-side sub pixels is reduced, and display quality is degraded. Specifically, the transmittance of the sub pixel of G corresponding to the white-side pixel is less than the maximum transmittance, and the white-side pixel is colored with magenta as illustrated in (3) of FIG. 8. In FIG. 8, a square frame with dot hatching represents a pixel colored with magenta.

In the related-art domain correction for suppressing degradation of display quality due to a domain, a voltage to be applied to each of the pixel electrodes 118 being the sub pixels of the respective colors corresponding to the white-side pixels is reduced for each color to reduce a difference between the voltages in the black-side sub pixel adjacent to the white-side sub pixel and the white-side sub pixel on the liquid crystal panel 100. Consequently, generation of a domain is suppressed. In contrast, in the present exemplary embodiment, the display control circuit 210 corrects a voltage of the data signal so that the transmittances of the three sub pixels on the white side are equivalent to one another.

Specifically, the display control circuit 210 maintains a transmittance of a sub pixel having the lowest transmittance, in other words, a transmittance of a sub pixel having the darkest color of the three sub pixels on the white side, and reduces the voltage of the data signal to the pixel electrodes 118 corresponding to the two remaining sub pixels so as to reduce the transmittance of each of the remaining sub pixels of the two colors. The white-side pixel is an example of a first display pixel in the present disclosure. The sub pixels of the respective colors R, G, and B corresponding to the white-side pixels are examples of a first panel pixel, a second panel pixel, and a third panel pixel in the present disclosure. The sub pixel having the lowest transmittance of the three sub pixels on the white side is referred to as a reference panel pixel, and the color of the reference panel pixel is referred to as a reference color.

The reason for maintaining the transmittance of the reference panel pixel and reducing the transmittance of each of the remaining white-side sub pixels of the two colors is as follows. Similar effects seem to be exerted by increasing the transmittance of the reference panel pixel and remaining the transmittance of each of the remaining white-side sub pixels of the two colors. However, in some cases, the reference panel pixel is the white-side sub pixel, and the transmittance cannot further be increased.

Figure 9:
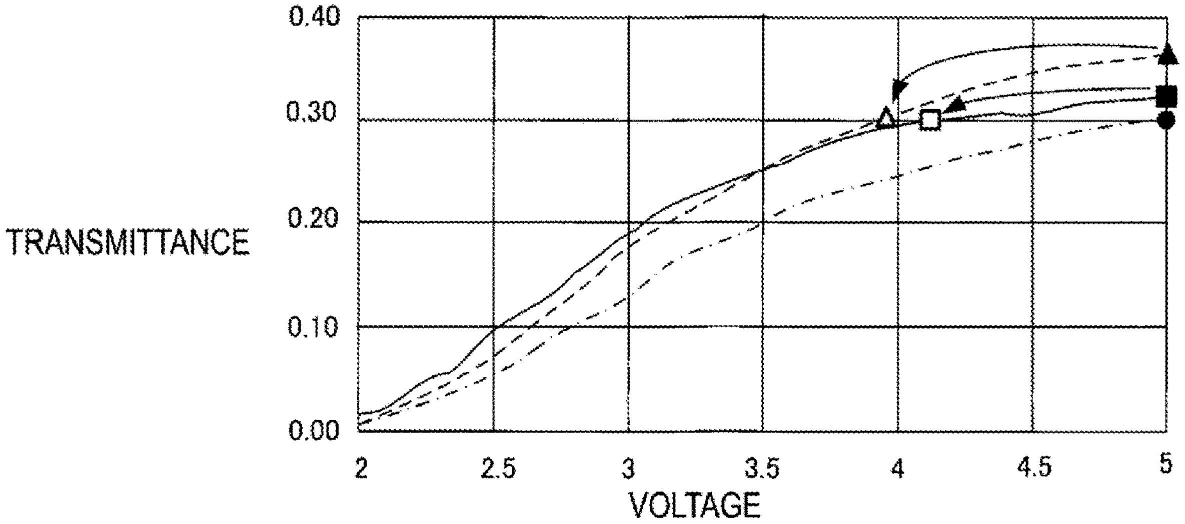
FIG. 9 is a diagram illustrating V-T characteristics of the liquid crystal panel for each wavelength.

It has gradually been known that, on the liquid crystal panel 100, characteristics of the transmittance with respect to the voltage applied to the liquid crystal element 120 differs for each wavelength of incidence light. FIG. 9 is a diagram illustrating applied voltage-transmittance characteristics (V-T characteristics) for each of the liquid crystal panels 100R, 100G, and 100B. In FIG. 9, the graph with the one-dot chain line represents the V-T characteristics of the liquid crystal panel 100R, the graph with the dot line represents the V-T characteristics of the liquid crystal panel 100G, and the graph with the solid line represents the V-T characteristics of the liquid crystal panel 100B. As illustrated in FIG. 9, even with the equivalent voltage applied to the liquid crystal element 120, the transmittance differs for each wavelength of incidence light. In detail, when the applied voltage is equivalent, the transmittance of R is lower than the transmittances of B and G. The transmittance referred to herein indicates a relative transmittance through normalization with a minimum value of 0 and a maximum value of 1.

As described above, in the related-art domain correction, the voltage applied to the pixel electrode 118 being the sub pixel of each of the colors on the white side is reduced for each color so as to suppress a domain. However, when the V-T characteristics differ for each wavelength of incidence light, the following problem is caused. In other words, when the voltage to be applied to the pixel electrode 118 being each of the sub pixels of the respective colors on the white side is reduced for each color, the voltage difference with respect to the adjacent black-side sub pixel is reduced. Consequently, a domain is improvingly suppressed. However, when the voltage to be applied to the pixel electrode 118 being each of the sub pixels of the respective colors on the white side is reduced for each color, variation in the transmittances of the respective colors R, G, and B is larger. In the white-side pixels, the ratio of the respective transmittances of R, G, and B is ideally 1:1:1. However, when variation in the transmittances of the respective colors R, G, and B is larger, coloring is caused in the white-side pixel.

In view of this, in the present exemplary embodiment, as illustrated in FIG. 9, the display control circuit 210 remains the transmittance of the sub pixel of R being the reference panel pixel, and reduces the voltage to be applied to the pixel electrode 118 being each of the two sub pixels, to the voltage indicated in the correction data stored in the correction LUT corresponding to the reference color so that the transmittance of each of the remaining white-side sub pixels of the two colors, in other words, the sub pixels of the respective colors G and B is equivalent to the transmittance of the reference panel pixel. Processing of reducing the voltage to be applied to the pixel electrode 118 being each of the two sub pixels on the white side other than the reference panel pixel is referred to as first correction processing. The solid black circle, triangle, and square in FIG. 9 represent the transmittances of the sub pixels of the respective colors R, G, and B corresponding to the white-side pixels, respectively. The white-outlined triangle and square in FIG. 9 represent the transmittances of the sub pixels of the respective colors G and B after correction by the first correction processing, respectively. In the present exemplary embodiment, as illustrated in FIG. 9, the transmittances of the three sub pixels corresponding to the white-side pixels are substantially equivalent to each other to satisfy the ratio of approximately 1:1:1. Thus, coloring in the white-side pixels is improvingly suppressed.

Even when the gray scale level, in other words, the voltage of the pixel electrode 118 of each of the two sub pixels on the white side other than the reference panel pixel is corrected, and a predetermined condition that coloring in the white-side pixels is confirmed by visual recognition or the like is satisfied, for example, a user of the display device 1 may instruct execution of second correction processing by an operation with respect to an operation unit, which is omitted in illustration. When execution of the second correction processing is instructed, the display control circuit 210 executes the second correction processing. In the second correction processing, of the three sub pixels corresponding to the black-side pixels adjacent to the white-side pixel corresponding to the reference panel pixel, the voltage to be supplied to the pixel electrode 118 being the sub pixel adjacent to the reference panel pixel is increased to the voltage indicated in the correction data stored in the correction LUT. When the voltage to be supplied to the pixel electrode 118 being the sub pixel adjacent to the reference panel pixel is increased, the horizontal electric field between the reference panel pixel and the sub pixel adjacent to the reference panel pixel is reduced. Consequently, a domain is suppressed. As a result of suppressing a domain, a transmittance of the reference panel pixel is high, and coloring on the white-side pixel is suppressed.

Next, the correction LUT is described. Data structures of the correction LUTs corresponding to the respective colors R, G, and B are the same. Thus, in the following description, stored contents of the correction LUT are described by giving the correction LUT corresponding to R as an example. FIG. 10 is a diagram illustrating an example of the stored contents of the correction LUT corresponding to R. As illustrated in FIG. 10, the correction LUT stores correction data indicating a correction value of a voltage of a sub pixel of each of the colors B and G in the first correction processing and correction data indicating a correction value of a voltage of a sub pixel of R in the second correction processing, in association with a gray scale level of a sub pixel of R on the black side and a gray scale level of a sub pixel or R on the white side. In the first correction processing, when the reference color is R, the display control circuit 210 reads out the correction data indicating the correction value of the voltage of the sub pixel of each of the colors B and G that is stored in the correction LUT of R in association with the gray scale level of the reference panel pixel and the gray scale level of the black-side sub pixel adjacent to the reference panel pixel on the liquid crystal panel 100R. Then, the first correction processing is executed by using the correction data. Similarly, in the second correction processing, the display control circuit 210 reads out the correction data indicating the correction value of the voltage of the sub pixel of each of R that is stored in the correction LUT of R in association with the gray scale level of the reference panel pixel and the gray scale level of the black-side sub pixel adjacent to the reference panel pixel on the liquid crystal panel 100R. Then, the second correction processing is executed by using the correction data.

The stored contents of the correction LUT may be set according to the V-T characteristics. For example, the V-T characteristics are specified by measuring the transmittance of the sub pixel of each of the colors of R, G, and B in a state in which a pattern image in which respective pixels of white, gray, and black are arranged is displayed by the display device 1. For example, specification of the V-T characteristics may be performed for each model of the display device 1, in other words, once with respect to one model. Setting of the stored contents of the correction LUT based on the V-T characteristics may be performed at the time of shipping the display device 1 from a factory, or the like. Further, the correction data stored in the correction LUT is multiplied by a coefficient to perform fine adjustment according to an individual difference of the display device 1, or the like. With this, the correction amounts in the first correction processing and the second correction processing may be adjusted. Further, the coefficient is set according to a function, where an argument is an elapsed time period from shipping of the display device 1 from a factory. Thus, the first correction processing and the second correction processing can be executed in consideration of aging degradation.

Figure 11:
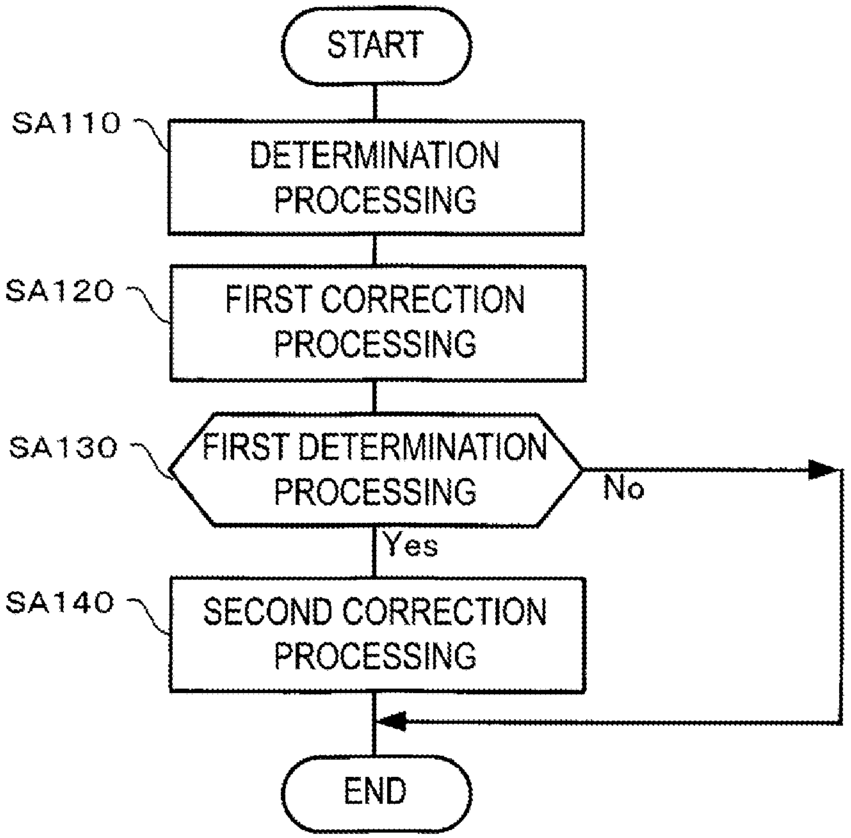
FIG. 11 is a flowchart illustrating a flow of processing of a control method executed by a display control circuit.

FIG. 11 is a flowchart illustrating a flow of processing of a control method executed by the display control circuit 210. As illustrated in FIG. 11, the control method includes determination processing SA110, first correction processing SA120, first determination processing SA130, and second correction processing SA140.

In the determination processing SA110, the display control circuit 210 determines the reference color and the reference panel pixel by analyzing each of the video data Vda_R, the video data Vda_G, and the video data Vda_B. In the present exemplary embodiment, the display control circuit 210 determines the sub pixel having the lowest transmittance of the three sub pixels corresponding to the white-side pixels adjacent to the black-side pixels, as the reference panel pixel, and determines the color corresponding to the reference panel pixel as a reference color. A position at which the black-side pixel and the white-side pixel are adjacent to each other is referred to as a domain boundary in some cases. Note that, for example, the transmittances of the three sub pixels corresponding to the white-side pixels at the domain boundary may be calculated based on the gray scale levels indicated in the video data Vda_R, the video data Vda_G, and the video data Vda_B, respectively, and the V-T characteristics described above.

Figure 12:
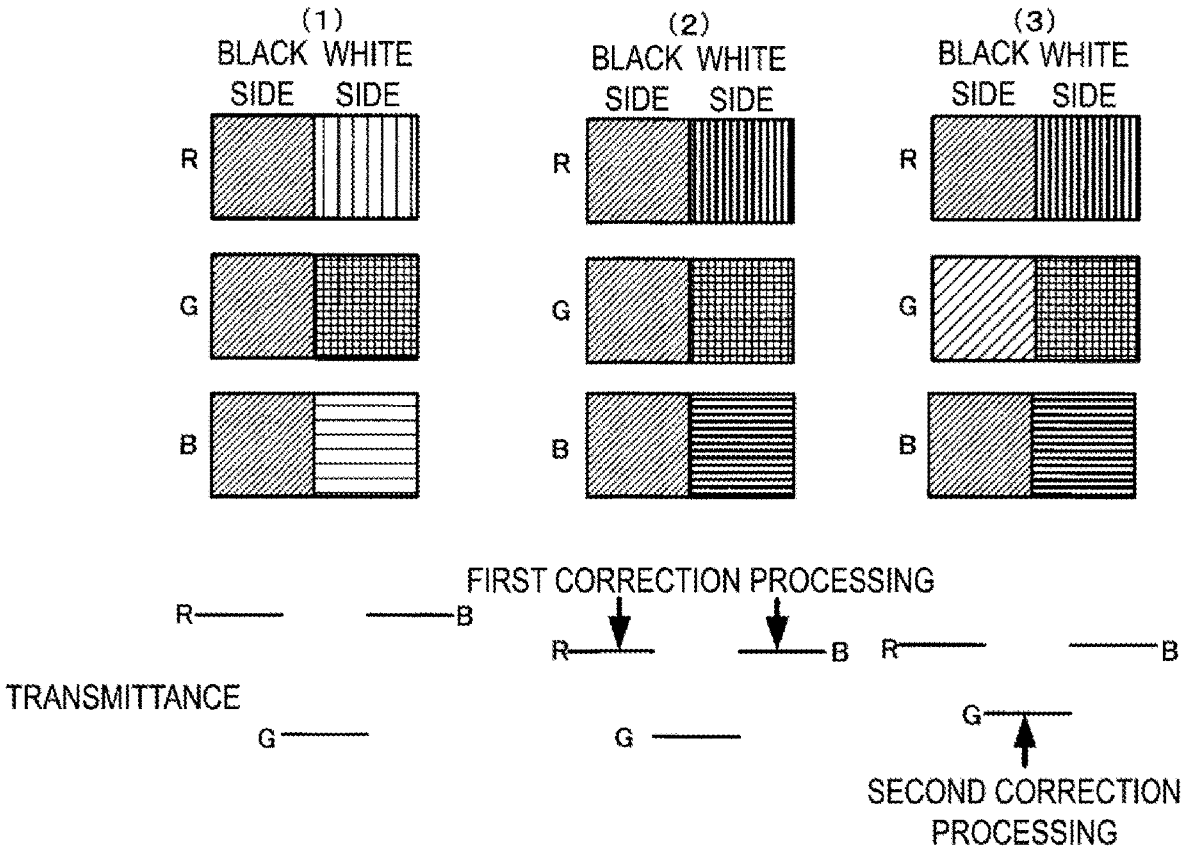
FIG. 12 is a diagram illustrating an operation example of the display device.

In the first correction processing SA120 after the determination processing SA110, the display control circuit 210 reduces the gray scale levels indicated in the video data corresponding to two sub pixels other than the reference panel pixel among the three sub pixels corresponding to the white-side pixels at the domain boundary while referring to the stored contents of the correction LUT corresponding to the reference color. For example, as illustrated in (1) of FIG. 12, it is assumed that, among the colors R, G, and B corresponding to the white-side pixels at the domain boundary, the transmittance of G is lower than the transmittances of the other two colors. In FIG. 12, the diagonal hatching, the vertical hatching, the lattice hatching, and the horizontal hatching represent black, R, G, and B, respectively. Further, in FIG. 12, density of the lines of the hatching represent a transmittance of each sub pixel. Specifically, as the density of the lines of the hatching is higher, the transmittance is lower. In this case, the display control circuit 210 determines G as the reference color, and reduces the transmittances of the sub pixels of the respective colors B and R corresponding to the white-side pixels, as illustrated in (2) of FIG. 12. The display control circuit 210 supplies, to the processing circuit 220B, the video data Vda_B in which the gray scale level of the sub pixel of B corresponding to the white-side pixel at the domain boundary is corrected. At the same time, the display control circuit 210 supplies, to the processing circuit 220R, the video data Vda_R in which the gray scale level of the sub pixel of R corresponding to the white-side pixel is corrected. Further, the display control circuit 210 supplies the video data Vda_G before correction to the processing circuit 220G.

In the first determination processing SA130 after the first correction processing SA120, the display control circuit 210 determines whether execution of the second correction processing is instructed. When the display control circuit 210 receives an operation signal for instructing execution of the second correction processing from the operation unit, the determination result in the first determination processing SA130 is "Yes". In contrast, when the display control circuit 210 receives another operation signal, for example, an operation signal for instructing termination of the present control method from the operation unit, the determination result in the first determination processing SA130 is "No". When the determination result in the first determination processing SA130 is "No", the display control circuit 210 terminates execution of the present control method. In contrast, when the determination result in the first determination processing SA130 is "Yes", the display control circuit 210 executes the second correction processing SA140.

In the second correction processing SA140, the display control circuit 210 increases the gray scale level indicated in the video data corresponding to the sub pixel adjacent to the reference panel pixel among the three sub pixels corresponding to the black-side pixels at the reference panel pixel while referring to the stored contents of the correction LUT corresponding to the reference color. As described above, the reference panel pixel in the present operation example is the sub pixel of the color of G on the white side. Thus, as illustrated in (3) of FIG. 12, the transmittance of the sub pixel of the color of G corresponding to the black-side pixel is increased by executing the second correction processing SA140. The display control circuit 210 supplies, to the processing circuit 220G, the video data Vda_G in which the gray scale level of the sub pixel of G corresponding to the black-side pixel at the domain boundary is corrected. At the same time, the display control circuit 210 supplies the video data Vda_R and the video data Vda_B after correction in the first correction processing SA120 to the processing circuit 220R and the processing circuit 220B, respectively.

As described above, according to the display device 1 of the first exemplary embodiment, the gray scale level of the pixel data supplied to the two sub pixels other than the reference panel pixel among the sub pixels of the respective colors R, G, and B corresponding to the white-side pixels at the domain boundary is reduced. Thus, the difference between the transmittance of the reference panel pixel and the transmittance of each of the two sub pixels is reduced. Consequently, coloring of the white-side pixels due to variation in transmittance can be suppressed. Further, according to the display device 1 of the first exemplary embodiment, when the second correction processing SA140 is executed, the horizontal electric field between the reference panel pixel and the sub pixel adjacent to the reference panel pixel is reduced. Consequently, a domain is suppressed. As a result of suppressing a domain, a transmittance of the reference panel pixel is high, and coloring on the white-side pixel is suppressed. In this manner, according to the display device 1 of the present exemplary embodiment, coloring of the white-side pixel at the domain boundary can be suppressed.

Figure 13:
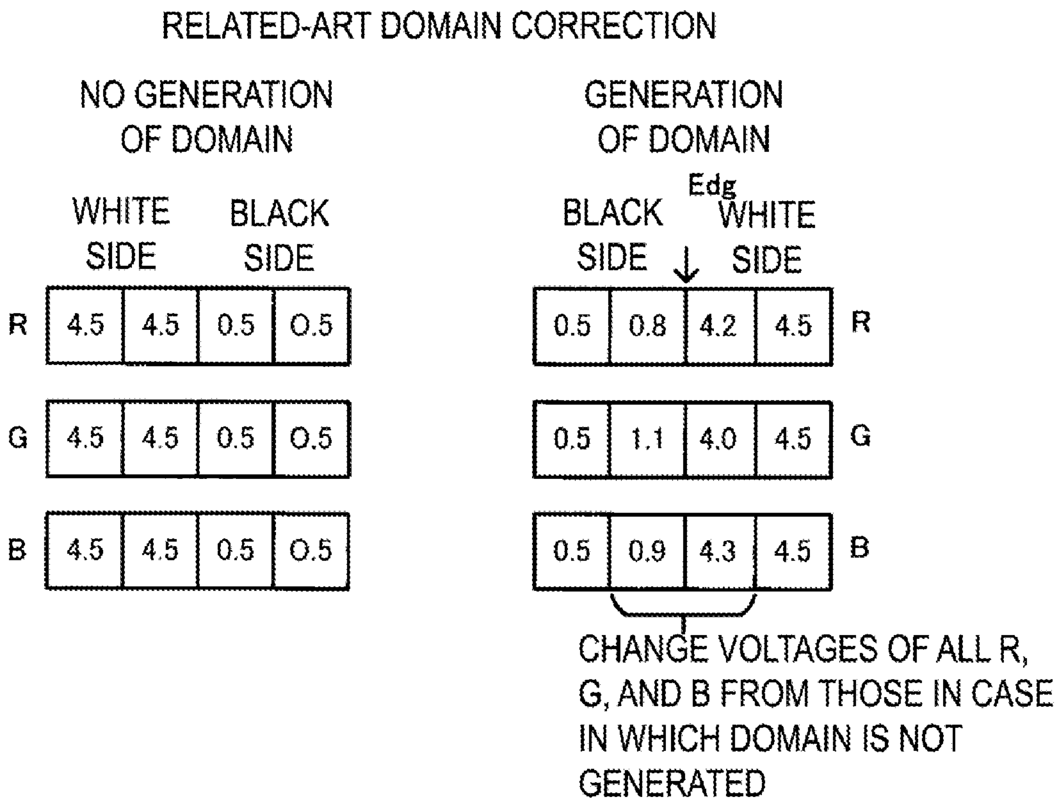
FIG. 13 is a diagram illustrating an example of a voltage to be applied to a pixel electrode of each sub pixel for domain correction in the related art.
Figure 14:
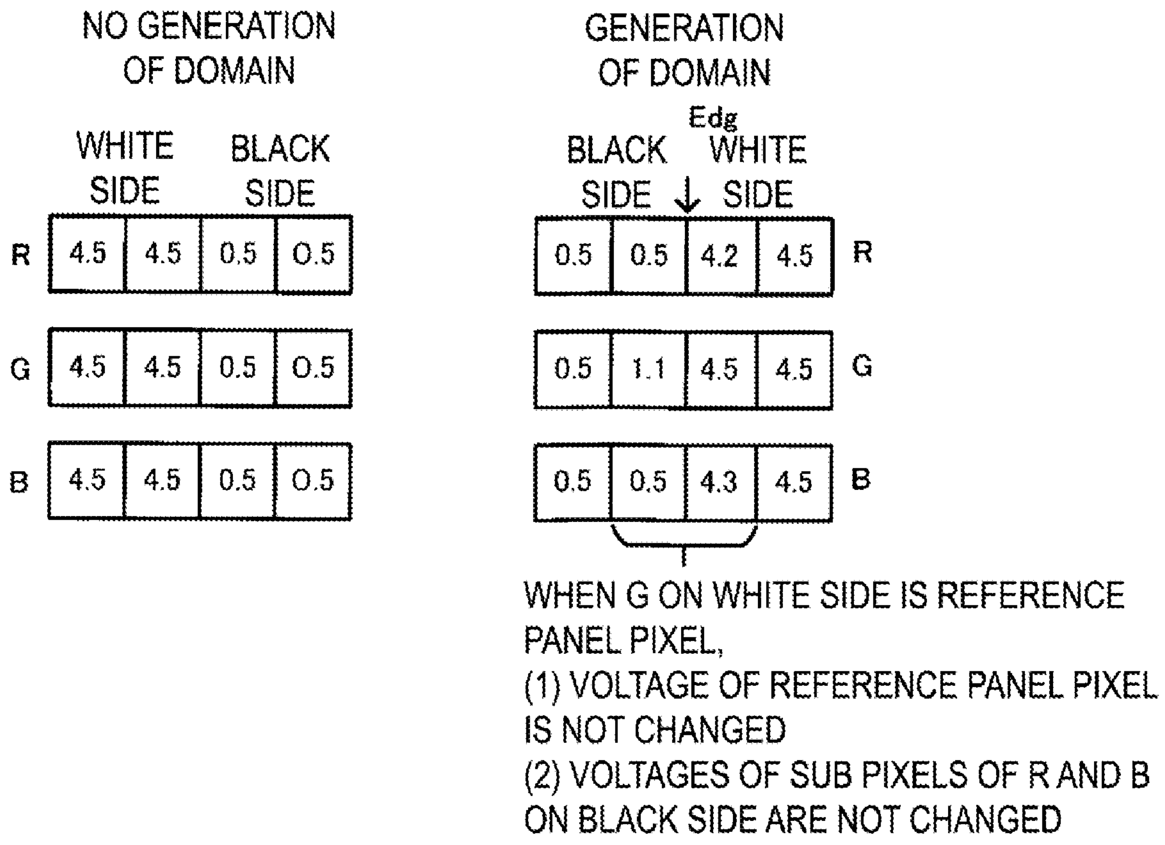
FIG. 14 is a diagram illustrating an example of a voltage to be applied to a pixel electrode of each sub pixel in the present exemplary embodiment.

In the related-art domain correction, as illustrated in FIG. 13, in all the sub pixels positioned at the domain boundary, the voltage applied to the pixel electrodes is changed from the voltage in a state in which a domain is not generated. In contrast, as described in FIG. 14, according to the display device 1 of the first exemplary embodiment, for example, the sub pixel of the color of G on the white side is the reference panel pixel among the sub pixels positioned at the domain boundary. In such a case, in the reference panel pixel and the sub pixels of the respective colors R and B on the black side, the voltage applied to the pixel electrodes is not changed from the voltage in a state in which a domain is not generated.

The first determination processing SA130 in the present exemplary embodiment is not necessary processing, and may be omitted. In an aspect in which the first determination processing SA130 is omitted, the second correction processing SA140 is executed after the first correction processing SA120. Further, the second correction processing SA140 is not necessary processing, and may also be omitted. In other words, the control method of the present exemplary embodiment may include the determination processing SA110 and the first correction processing SA120.

B: Second Exemplary Embodiment

Figure 15:
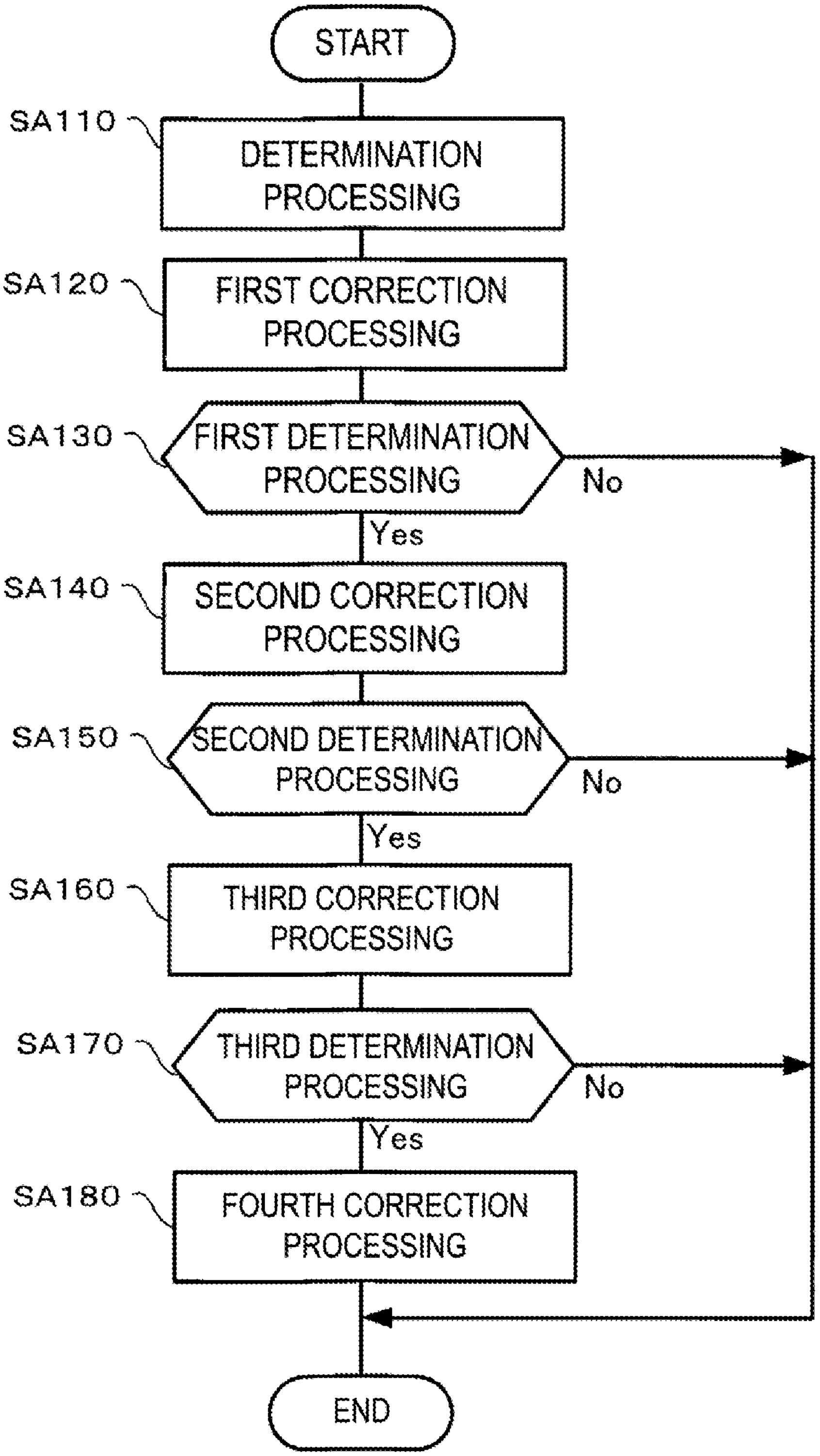
FIG. 15 is a flowchart illustrating a flow of processing of a control method of a second exemplary embodiment.

The display control circuit 210 may be execute a control method illustrated in FIG. 15, instead of the control method illustrated in FIG. 11. In FIG. 11 and FIG. 15, the same processing is denoted with the same reference symbol. As apparent from comparison between FIG. 11 and FIG. 15, the control method of the present exemplary embodiment is different from the control method of the first exemplary embodiment in that second determination processing SA150, third correction processing SA160, third determination processing SA170, and fourth correction processing SA180 are included. Further, in the present exemplary embodiment, the correction LUT stores correction data for the third correction processing and the fourth correction processing, in addition to the correction data for the first correction processing and the second correction processing. For example, in a case of the correction LUT corresponding to R, the data indicating the correction value of the gray scale level of the video data corresponding to the reference panel pixel is given as an example of the correction data in the third correction processing. Similarly, the data indicating the correction value of the gray scale level of the video data of the two sub pixels other than the sub pixel adjacent to the reference panel pixel among the three sub pixels corresponding to the black-side pixels is given as an example of the correction data in the fourth correction processing.

As illustrated in FIG. 15, the second determination processing SA150 is processing executed after the second correction processing SA140. In the second determination processing SA150, the display control circuit 210 determines whether execution of the third correction processing is instructed. When the display control circuit 210 receives an operation signal for instructing execution of the third correction processing from the operation unit, the determination result in the second determination processing SA150 is "Yes". In contrast, when the display control circuit 210 receives another operation signal, for example, an operation signal for instructing termination of the present control method from the operation unit, the determination result in the second determination processing SA150 is "No". When the determination result in the second determination processing SA150 is "No", the display control circuit 210 terminates execution of the present control method. In contrast, when the determination result in the second determination processing SA150 is "Yes", the display control circuit 210 executes the third correction processing SA160.

In the third correction processing SA160, the display control circuit 210 increases the gray scale level of the video data corresponding to the reference panel pixel while referring to the stored contents of the correction LUT corresponding to the reference color. Similarly to the operation example in the first exemplary embodiment, it is assumed that the reference panel pixel in the present operation example is the sub pixel of the color of G on the white side. It is assumed that, at the time of starting execution of the third correction processing SA160, the transmittances of the sub pixels of the respective colors of R, G, and B corresponding to the white-side pixels are in the state illustrated in (1) of FIG. 16.

Figure 16:
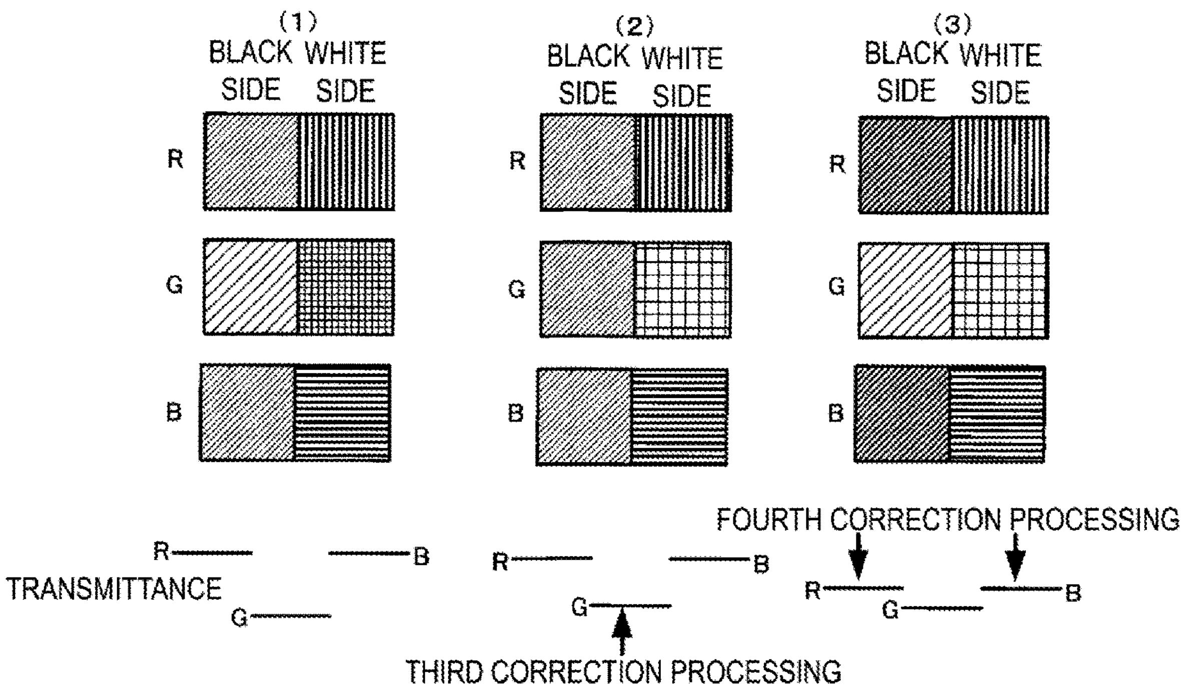
FIG. 16 is a diagram illustrating an operation example of a display device of the second exemplary embodiment.

Similarly to FIG. 12, in FIG. 16, the diagonal hatching, the vertical hatching, the lattice hatching, and the horizontal hatching represent black, R, G, and B, respectively. Further, similarly to FIG. 12, in FIG. 16, density of the lines of the hatching represent a transmittance of each sub pixel. In this case, as illustrated in (2) of FIG. 16, the transmittance of the sub pixel of the color of G corresponding to the white-side pixel is increased by executing the third correction processing SA160. The display control circuit 210 supplies, to the processing circuit 220G, the video data Vda_G in which the gray scale level of the sub pixel of G corresponding to each of the black-side pixel and the white-side pixel at the domain boundary is corrected. At the same time, the display control circuit 210 supplies the video data Vda_R and the video data Vda_B after correction in the first correction processing SA120 to the processing circuit 220R and the processing circuit 220B, respectively. When the third correction processing SA160 is executed, the difference between the transmittance of the reference panel pixel and the transmittance of each of the other two sub pixels on the white side is further reduced. Consequently, coloring of the white-side pixels due to variation in transmittance can be suppressed.

In the third determination processing SA170 after the third correction processing SA160, the display control circuit 210 determines whether execution of the fourth correction processing is instructed. When the display control circuit 210 receives an operation signal for instructing execution of the fourth correction processing from the operation unit, the determination result in the third determination processing SA170 is "Yes". In contrast, when the display control circuit 210 receives another operation signal, for example, an operation signal for instructing termination of the present control method from the operation unit, the determination result in the third determination processing SA170 is "No". When the determination result in the third determination processing SA170 is "No", the display control circuit 210 terminates execution of the present control method. In contrast, when the determination result in the third determination processing SA170 is "Yes", the display control circuit 210 executes the fourth correction processing SA180.

In the fourth correction processing SA180, the display control circuit 210 reduces the gray scale level indicated in the video data corresponding to the sub pixel other than the sub pixel adjacent to the reference panel pixel among the three sub pixels corresponding to the black-side pixels at the reference panel pixel while referring to the stored contents of the correction LUT corresponding to the reference color. As described above, the reference panel pixel in the present operation example is the sub pixel of the color of G on the white side. Thus, as illustrated in (3) of FIG. 16, the transmittances of the sub pixels of the colors of R and B corresponding to the black-side pixels are reduced by executing the fourth correction processing SA180. The display control circuit 210 supplies, to the processing circuit 220G, the video data Vda_G in which the gray scale level of the sub pixel of G corresponding to the black-side pixel at the domain boundary is corrected. At the same time, the display control circuit 210 supplies the video data Vda_R and the video data Vda_B after correction in the first correction processing SA120 to the processing circuit 220R and the processing circuit 220B, respectively. When the fourth correction processing SA180 is executed, the gray scale levels of the black-side sub pixels are increased for the respective colors of R and B. With this, the horizontal electric field at the domain boundary is intensified, and the transmittances of the sub pixels of the respective colors of R and B are reduced. As a result, variation in transmittance of the sub pixels of the respective colors of R, G, and B corresponding to the white-side pixels is further reduced, and coloring in the white-side pixels is further suppressed.

As described above, according to the control method of the second exemplary embodiment, coloring of the white-side pixel at the domain boundary can further be suppressed as compared to the first exemplary embodiment.

C. Modification Examples

The first exemplary embodiment and the second exemplary embodiment of the present disclosure are described above. Those exemplary embodiments may be modified as describe below.

C-1: Modification Example 1

The first exemplary embodiment and the second exemplary embodiment described above, description is made on a normally black mode. However, a normally white mode may be adopted. Further, the liquid crystal panels 100R, 100G, and 100B are of a transmission type, but may be a reflection type.

C-2: Modification Example 2

Figure 17:
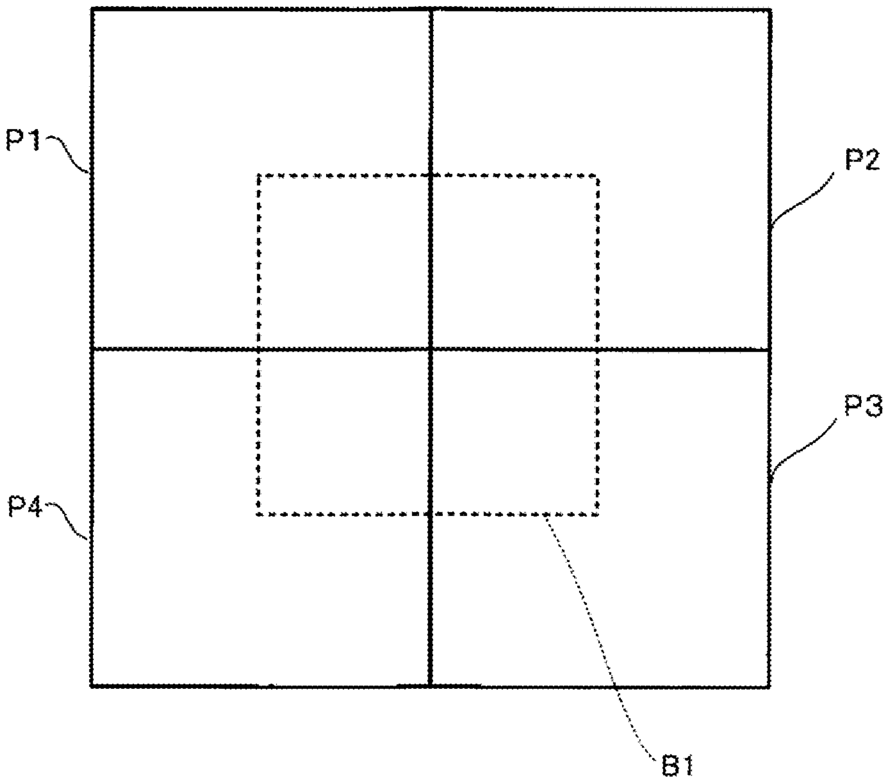
FIG. 17 is an explanatory diagram of shifting of a position of a display pixel by an optical path shift element.

The display device 1 may include an optical path shift element that shifts a position of a display pixel for each unit period included within one frame, the display pixel being formed by emission light from each of the liquid crystal panel 100R, the liquid crystal panel 100G, and the liquid crystal panel 100B. A high resolution may be achieved by shifting a position of the display pixel for each unit period. For example, one frame is sectioned into four unit periods, the optical path shift element is used to shift a display position of a display pixel B1 to a position P1, a position P2, a position P3, and a position P4, as illustrated in FIG. 17. With this, a resolution four times as high as the resolution of the liquid crystal panel 100 is achieved. According to the present aspect, in the display device that achieves a high resolution by shifting a position of the display pixel for a unit period, it is possible to suppress coloring of the display image due to a difference between a transmittance of the reference panel pixel and a transmittance of each of the two panel pixels other than the reference panel pixel.

C-3: Modification Example 3

The correction LUT in the exemplary embodiment described above is a two-dimensional look-up table in which the correction value of the sub pixel of R on the black side and the correction value of each of the sub pixels of the respective colors of G and B on the white side are stored in association with the gray scale level of the sub pixel of R on the black side and the gray scale level of the sub pixel of R on the white side. However, the correction LUT in the present disclosure may be a one-dimensional look-up table in which the correction value of the sub pixel of R on the black side and the correction value of the sub pixel of each of the colors of G and B on the white side are stored in association with the difference between the gray scale level of the sub pixel of R on the black side and the gray scale level of the sub pixel of R on the white side.

Figure 18:
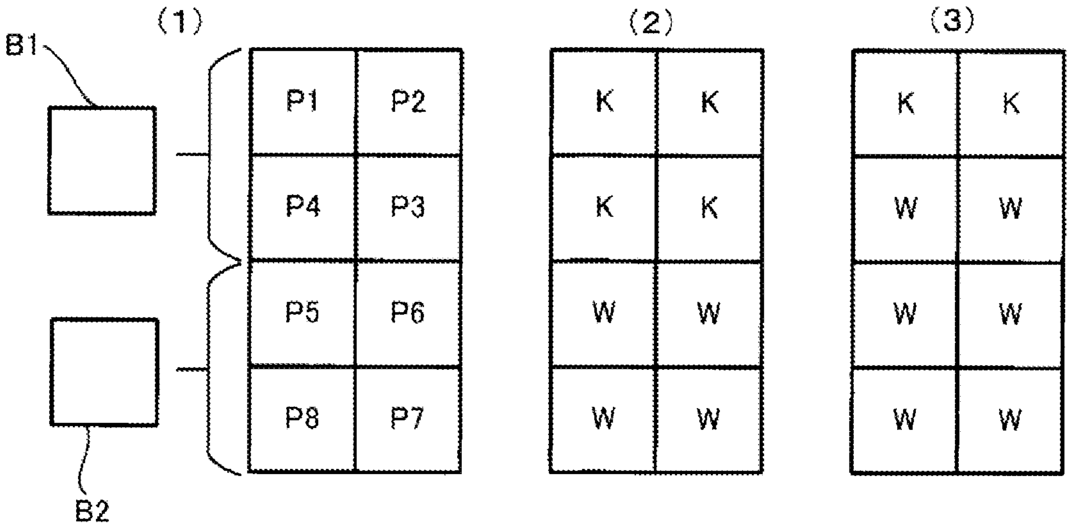
FIG. 18 is an explanatory diagram of degradation of display quality in the display device including the optical path shift element.

Further, in a case of the display device that achieves a high resolution by shifting a position of the display pixel for a unit period as illustrated in (1) of FIG. 18, a display pixel B2 is a white-side pixel and the display pixel B1 is a black-side pixel over one frame as illustrated in (2) of FIG. 18. In such a case, color deviation due to a domain is caused at a position P5 and a position P6. Note that, in FIG. 18, W represents a white-side pixel and K represents a black-side pixel. In contrast, as illustrated in (3) of FIG. 18, it is assumed that the display pixel B1 is switched from the black-side pixel to the white-side pixel while the display pixel B2 is the white-side pixel over one frame. In this case, degradation of display quality due to a liquid crystal response is caused at the position P3 and the position P4, and color deviation due to a domain is caused at the position P5 and the position P6. According to the display device of the present disclosure, even when degradation of display quality due to a liquid crystal response and coloring due to a domain are caused in combination, the stored contents of the correction LUT is set so that the transmissions of the respective sub pixels being the respective white-side pixels displayed at positions P3 to P8 are equivalent to each other. With this, the above-mentioned degradation of display quality caused in combination can be suppressed.

D. Conclusion of Present Disclosure

The present disclosure is not limited to the exemplary embodiments and the modification examples that are described above, and may be implemented in various aspects without departing from the spirits of the disclosure. For example, the present disclosure may be achieved through the following aspects. Appropriate replacements or combinations may be made to the technical features in the above-described exemplary embodiments which correspond to the technical features in the aspects described below to solve some or all of the problems of the disclosure or to achieve some or all of the advantageous effects of the disclosure. Further, when the technical characteristics are not described as essential ones in the present specification, the technical characteristics can be appropriately deleted.

A summary of the present disclosure is appended below.

Appendix 1

According one aspect of the present disclosure, a control method for a display device is a control method for a display device including a first liquid crystal panel, a second liquid crystal panel, and a third liquid crystal panel and being configured to display an image, based on emission light from the first liquid crystal panel, emission light from the second liquid crystal panel, and emission light from the third liquid crystal panel, the control method including supplying first color pixel data to the first liquid crystal panel, supplying second color pixel data being different from the first color pixel data to the second liquid crystal panel, and supplying third color pixel data being different from the first color pixel data and the second color pixel data to the third liquid crystal panel, and reducing a gray scale level of pixel data supplied to panel pixels other than a reference panel pixel among a first panel pixel, a second panel pixel and a third panel pixel, the reference panel pixel being a panel pixel having the lowest transmittance among the first panel pixel of the first liquid crystal panel that corresponds to a first display pixel, the second panel pixel of the second liquid crystal panel that corresponds to the first display pixel, and the third panel pixel of the third liquid crystal panel that corresponds to the first display pixel, in the image.

According to the control method described in (Appendix 1), the gray scale level of the pixel data supplied to the panel pixels other than the reference panel pixel among the first panel pixel, the second panel pixel, and the third panel pixel is reduced. Thus, a difference between a transmittance of the reference panel pixel and a transmittance of each of the two panel pixels other than the reference panel pixel among the first panel pixel, the second panel pixel, and the third panel pixel is reduced. Consequently, coloring of the display image due to variation in transmittance can be suppressed.

Appendix 2

A control method of (Appendix 2) is the control method described in (Appendix 1), wherein the display device includes an optical path shift element configured to shift a position of a display pixel for each unit period included within one frame, the display pixel being formed by emission light from each of the first liquid crystal panel, the second liquid crystal panel, and the third liquid crystal panel.

According to the control method described in (Appendix 2), in the display device that achieves a high resolution by shifting a position of the display pixel for a unit period, it is possible to suppress coloring of the display image due to a difference between a transmittance of the reference panel pixel and a transmittance of each of the two panel pixels other than the reference panel pixel.

Appendix 3

A control method of (Appendix 3) is the control method described in (Appendix 1) or (Appendix 2) including increasing a gray scale level of pixel data supplied to a panel pixel adjacent to the reference panel pixel, the panel pixel being a panel pixel of a fourth panel pixel of the first liquid crystal panel that corresponds to a second display pixel adjacent to the first display pixel in the image, a fifth panel pixel of the second liquid crystal panel that corresponds to the second display pixel, and a sixth panel pixel of the third liquid crystal panel that corresponds to the second display pixel.

According to the control method described in (Appendix 3), the gray scale level of the pixel data supplied to the panel pixel adjacent to the reference panel pixel among the fourth panel pixel, the fifth panel pixel, and the sixth panel pixel is increased. With this, a horizontal electric field between the reference panel pixel and the panel pixel adjacent to the reference panel pixel is reduced. Consequently, a domain is suppressed. As a result of suppressing a domain, a transmittance of the reference panel pixel is high, and coloring is suppressed.

Appendix 4

A control method of (Appendix 4) is the control method described in (Appendix 3) including increasing a gray scale level of pixel data supplied to the reference panel pixel.

According to the control method described in (Appendix 4), a transmittance of the reference panel pixel is high as the gray scale level of the pixel data supplied to the reference panel pixel is increased. Thus, a difference between a transmittance of the reference panel pixel and a transmittance of each of the two panel pixels other than the reference panel pixel among the first panel pixel, the second panel pixel, and the third panel pixel is further reduced. Consequently, coloring of the display image due to variation in transmittance can be suppressed.

Appendix 5

A control method of (Appendix 5) is the control method described in (Appendix 4) including reducing a gray scale level of pixel data supplied to panel pixels other than the panel pixel adjacent to the reference panel pixel among the fourth panel pixel, the fifth panel pixel, and the sixth panel pixel.

According to the control method described in (Appendix 5), the gray scale level of the pixel data supplied to the panel pixels other than the panel pixel adjacent to the reference panel pixel is reduced. Thus, a horizontal electric field at a domain boundary is intensified, and a transmittance of the panel pixels other than the panel pixel adjacent to the reference panel pixel among the fourth panel pixel, the fifth panel pixel, and the sixth panel pixel is reduced. As a result, variation in transmittance is further suppressed.

Appendix 6

A control method of (Appendix 6) is the control method described in any one of (Appendix 1), (Appendix 2), (Appendix 3), and (Appendix 5), wherein a gray scale level of the first display pixel is higher than a gray scale level of the second display pixel.

According to the control method described in (Appendix 6), degradation of display quality due to a difference between the gray scale level of the first display pixel and the gray scale level of the second display pixel can be suppressed.

Appendix 7

According to another aspect of the present disclosure, a control method for a display device is a control method for a display device including a first liquid crystal panel, a second liquid crystal panel, and a third liquid crystal panel, being configured to display an image, based on emission light from the first liquid crystal panel, emission light from the second liquid crystal panel, and emission light from the third liquid crystal panel, and being provided with a correction look-up table that stores correction data corresponding to a difference between gray scale levels of two display pixels adjacent to each other in the image, the control method including acquiring correction data from the correction look-up table, based on pixel data indicating a gray scale level of each color of a first display pixel in the image and pixel data indicating a gray scale level of a second display pixel adjacent to the first display pixel, reducing a gray scale level of pixel data, based on the correction data, the pixel data being supplied to panel pixels other than a reference panel pixel among a first panel pixel, a second panel pixel, and a third panel pixel, the reference panel pixel being a panel pixel having the lowest transmittance among the first panel pixel of the first liquid crystal panel that corresponds to the first display pixel, the second panel pixel of the second liquid crystal panel that corresponds to the first display pixel, and the third panel pixel of the third liquid crystal panel that corresponds to the first display pixel, and supplying pixel data in which gray scale levels of two colors are corrected based on the correction data, for each color to the first liquid crystal panel, the second liquid crystal panel, and the third liquid crystal panel.

According to the control method described in (Appendix 7), the gray scale level of the pixel data supplied to the panel pixels other than the reference panel pixel among the first panel pixel, the second panel pixel, and the third panel pixel is reduced based on the correction data stored in the correction look-up table. Thus, a difference between a transmittance of the reference panel pixel and a transmittance of each of the two panel pixels other than the reference panel pixel among the first panel pixel, the second panel pixel, and the third panel pixel is reduced. Consequently, coloring of the display image due to variation in transmittance can be suppressed.

Appendix 8

According to one aspect of the present disclosure, a display device includes a first liquid crystal panel, a second liquid crystal panel, a third liquid crystal panel, a storage device configured to store a correction look-up table that stores correction data corresponding to a difference between gray scale levels of two display pixels adjacent to each other in an image displayed based on emission light from the first liquid crystal panel, emission light from the second liquid crystal panel, and emission light from the third liquid crystal panel, and a control device, wherein the control device executes processing of acquiring correction data from the correction look-up table, based on pixel data indicating a gray scale level of each color of a first display pixel in the image and pixel data indicating a gray scale level of a second display pixel adjacent to the first display pixel, reducing a gray scale level of pixel data, based on the correction data, the pixel data being supplied to panel pixels other than a reference panel pixel among a first panel pixel, a second panel pixel, and a third panel pixel, the reference panel pixel being a panel pixel having the lowest transmittance among the first panel pixel of the first liquid crystal panel that corresponds to the first display pixel, the second panel pixel of the second liquid crystal panel that corresponds to the first display pixel, and the third panel pixel of the third liquid crystal panel that corresponds to the first display pixel, and supplying pixel data in which gray scale levels of two colors are corrected based on the correction data, for each color to the first liquid crystal panel, the second liquid crystal panel, and the third liquid crystal panel.

According to the display device described in (Appendix 8), the gray scale level of the pixel data supplied to the panel pixels other than the reference panel pixel among the first panel pixel, the second panel pixel, and the third panel pixel is reduced based on the correction data stored in the correction look-up table. Thus, a difference between a transmittance of the reference panel pixel and a transmittance of each of the two panel pixels other than the reference panel pixel among the first panel pixel, the second panel pixel, and the third panel pixel is reduced. Consequently, coloring of the display image due to variation in transmittance can be suppressed.

What is claimed is:

1. A control method for a display device including a first liquid crystal panel, a second liquid crystal panel, and a third liquid crystal panel and being configured to display an image, based on emission light from the first liquid crystal panel, emission light from the second liquid crystal panel, and emission light from the third liquid crystal panel, the control method comprising:

supplying first color pixel data to the first liquid crystal panel, supplying second color pixel data being different from the first color pixel data to the second liquid crystal panel, and supplying third color pixel data being different from the first color pixel data and the second color pixel data to the third liquid crystal panel; and reducing a gray scale level of pixel data supplied to panel pixels other than a reference panel pixel among a first panel pixel, a second panel pixel and a third panel pixel, the reference panel pixel being a panel pixel having the lowest transmittance among the first panel pixel of the first liquid crystal panel that corresponds to a first display pixel, the second panel pixel of the second liquid crystal panel that corresponds to the first display pixel, and the third panel pixel of the third liquid crystal panel that corresponds to the first display pixel, in the image.

2. The control method for a display device according to claim 1, wherein the display device includes an optical path shift element configured to shift a position of a display pixel for each unit period included within one frame, the display pixel being formed by emission light from each of the first liquid crystal panel, the second liquid crystal panel, and the third liquid crystal panel.

3. The control method for a display device according to claim 1, comprising:

increasing a gray scale level of pixel data supplied to a panel pixel adjacent to the reference panel pixel, the panel pixel being a panel pixel of a fourth panel pixel of the first liquid crystal panel that corresponds to a second display pixel adjacent to the first display pixel in the image, a fifth panel pixel of the second liquid crystal panel that corresponds to the second display pixel, and a sixth panel pixel of the third liquid crystal panel that corresponds to the second display pixel.

4. The control method for a display device according to claim 3, comprising:

increasing a gray scale level of pixel data supplied to the reference panel pixel.

5. The control method for a display device according to claim 4, comprising:

reducing a gray scale level of pixel data supplied to panel pixels other than the panel pixel adjacent to the reference panel pixel among the fourth panel pixel, the fifth panel pixel, and the sixth panel pixel.

6. The control method for a display device according to claim 1, wherein a gray scale level of the first display pixel is higher than a gray scale level of the second display pixel.

7. A control method for a display device including a first liquid crystal panel, a second liquid crystal panel, and a third liquid crystal panel, being configured to display an image, based on emission light from the first liquid crystal panel, emission light from the second liquid crystal panel, and emission light from the third liquid crystal panel, and being provided with a correction look-up table that stores correction data corresponding to a difference between gray scale levels of two display pixels adjacent to each other in the image, the control method comprising:

acquiring correction data from the correction look-up table, based on pixel data indicating a gray scale level of each color of a first display pixel in the image and pixel data indicating a gray scale level of a second display pixel adjacent to the first display pixel;

reducing a gray scale level of pixel data, based on the correction data, the pixel data being supplied to panel pixels other than a reference panel pixel among a first panel pixel, a second panel pixel, and a third panel pixel, the reference panel pixel being a panel pixel having the lowest transmittance among the first panel pixel of the first liquid crystal panel that corresponds to the first display pixel, the second panel pixel of the second liquid crystal panel that corresponds to the first display pixel, and the third panel pixel of the third liquid crystal panel that corresponds to the first display pixel; and supplying pixel data in which gray scale levels of two colors are corrected based on the correction data, for each color to the first liquid crystal panel, the second liquid crystal panel, and the third liquid crystal panel.

8. A display device, comprising:

a first liquid crystal panel;

a second liquid crystal panel;

a third liquid crystal panel;

a storage device configured to store a correction look-up table that stores correction data corresponding to a difference between gray scale levels of two display pixels adjacent to each other in an image displayed based on emission light from the first liquid crystal panel, emission light from the second liquid crystal panel, and emission light from the third liquid crystal panel; and a control device, wherein the control device executes processing of:

acquiring correction data from the correction look-up table, based on pixel data indicating a gray scale level of each color of a first display pixel in the image and pixel data indicating a gray scale level of a second display pixel adjacent to the first display pixel;

reducing a gray scale level of pixel data, based on the correction data, the pixel data being supplied to panel pixels other than a reference panel pixel among a first panel pixel, a second panel pixel, and a third panel pixel, the reference panel pixel being a panel pixel having the lowest transmittance among the first panel pixel of the first liquid crystal panel that corresponds to the first display pixel, the second panel pixel of the second liquid crystal panel that corresponds to the first display pixel, and the third panel pixel of the third liquid crystal panel that corresponds to the first display pixel; and supplying pixel data in which gray scale levels of two colors are corrected based on the correction data, for each color to the first liquid crystal panel, the second liquid crystal panel, and the third liquid crystal panel.

* * * * *